United States Patent [19]

Harima

[11] Patent Number: 5,680,756
[45] Date of Patent: Oct. 28, 1997

[54] FUEL-VAPOR TREATMENT METHOD AND APPARATUS FOR INTERNAL COMBUSTION ENGINE

[75] Inventor: Kenji Harima, Susono, Japan

[73] Assignee: Toyota Jidosha Kabushiki Kaisha, Aichi, Japan

[21] Appl. No.: 523,996

[22] Filed: Sep. 5, 1995

[30] Foreign Application Priority Data

Oct. 27, 1994 [JP] Japan ................................. 6-263854

[51] Int. Cl.$^6$ ............................................... F01N 3/20
[52] U.S. Cl. ...................... 60/274; 60/276; 60/277; 60/285; 123/520
[58] Field of Search ................................ 60/274, 283, 285, 60/276, 277; 123/520

[56] References Cited

U.S. PATENT DOCUMENTS

| | | | |
|---|---|---|---|
| 4,986,070 | 1/1991 | Abe | 60/285 |
| 5,239,824 | 8/1993 | Matsumoto | 60/283 |
| 5,245,975 | 9/1993 | Ito | 60/283 |
| 5,323,751 | 6/1994 | Osanai et al. | 123/520 |

*Primary Examiner*—Douglas Hart
*Attorney, Agent, or Firm*—Kenyon & Kenyon

[57] ABSTRACT

This invention is concerned with a fuel-vapor treatment method and apparatus for an internal combustion engine that do not introduce perturbations in the air/fuel ratio during purge-on or purge-off operations. According to the method and apparatus disclosed herein, a sensor output voltage $\alpha$ (for example, 4.5 V) is set that indicates a catalyst atmosphere neither rich nor lean, or in other words, at stoichiometry. When the present output voltage of a sub $O_2$ sensor is greater than $\alpha$, indicating a rich atmosphere, a purge-off operation which entails enrichment is prohibited and a purge-on operation which entails making the atmosphere lean is allowed. Conversely, when the present output voltage of the sub $O_2$ sensor is not greater than $\alpha$, indicating a lean atmosphere, a purge-on operation which entails making the atmosphere lean is prohibited and a purge-off operation which entails enrichment is allowed.

5 Claims, 12 Drawing Sheets

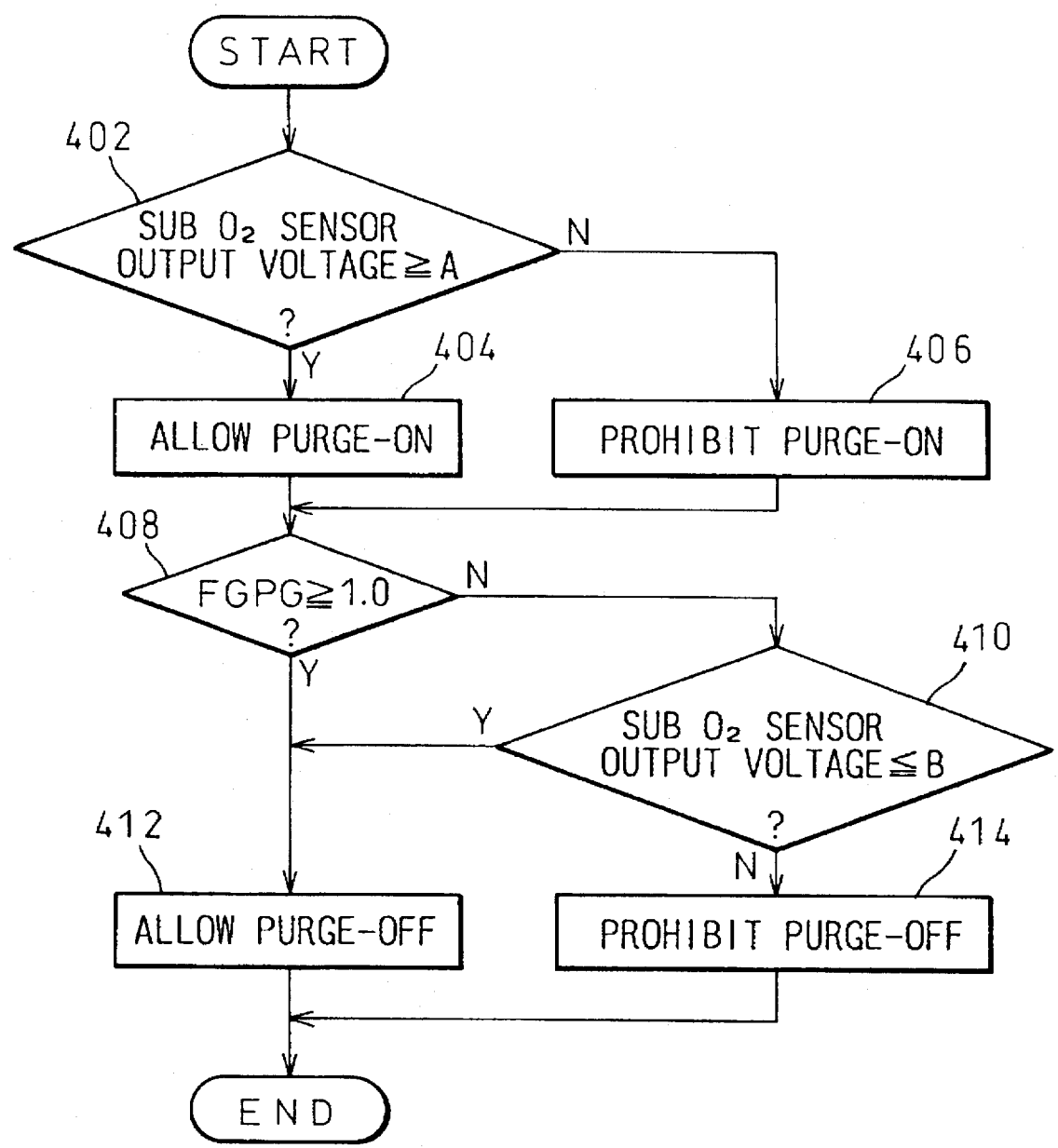

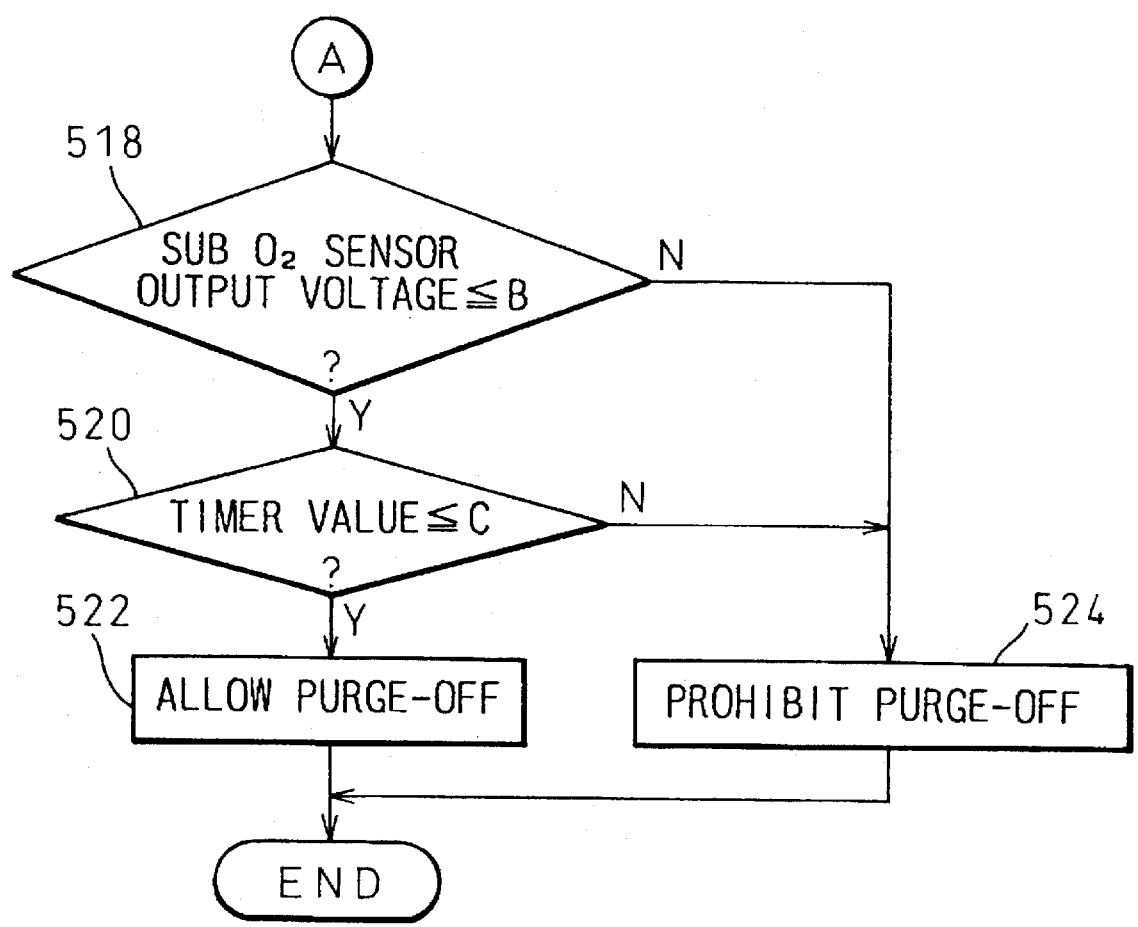

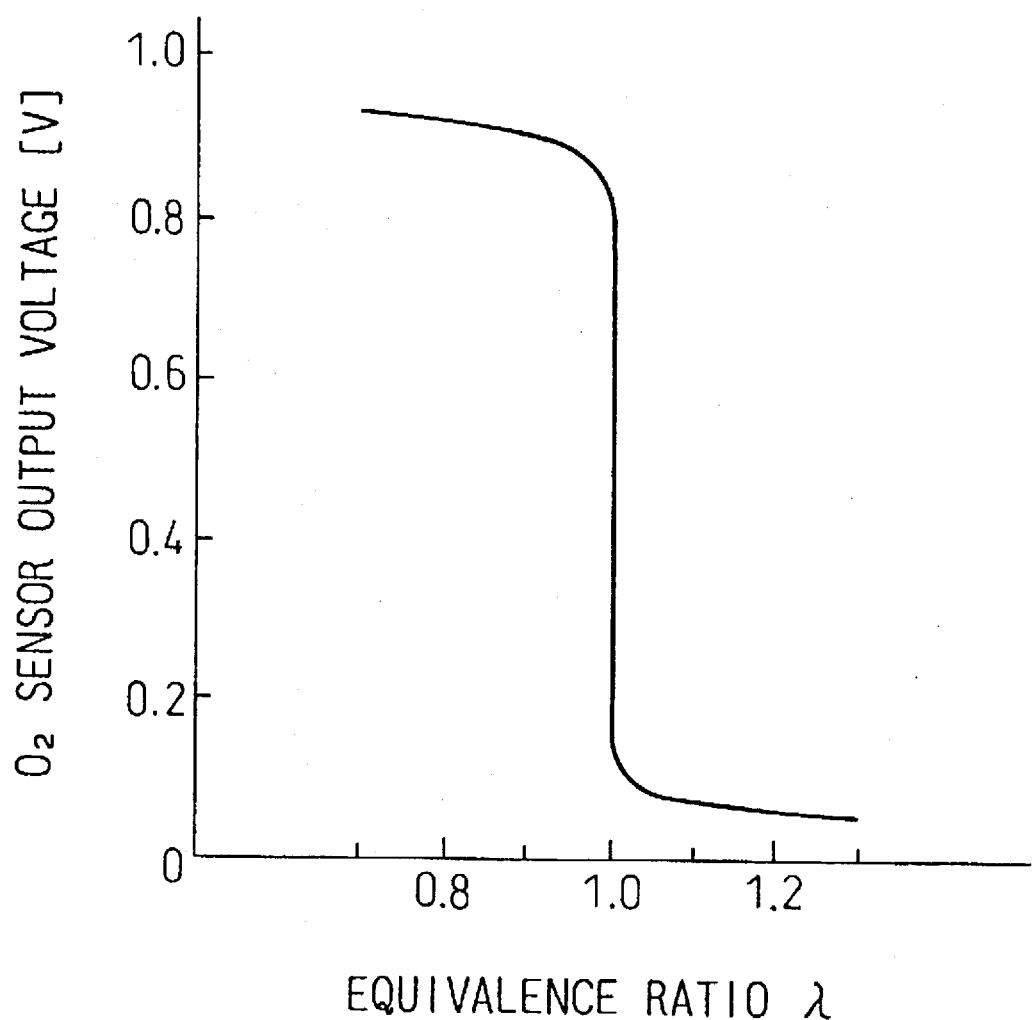

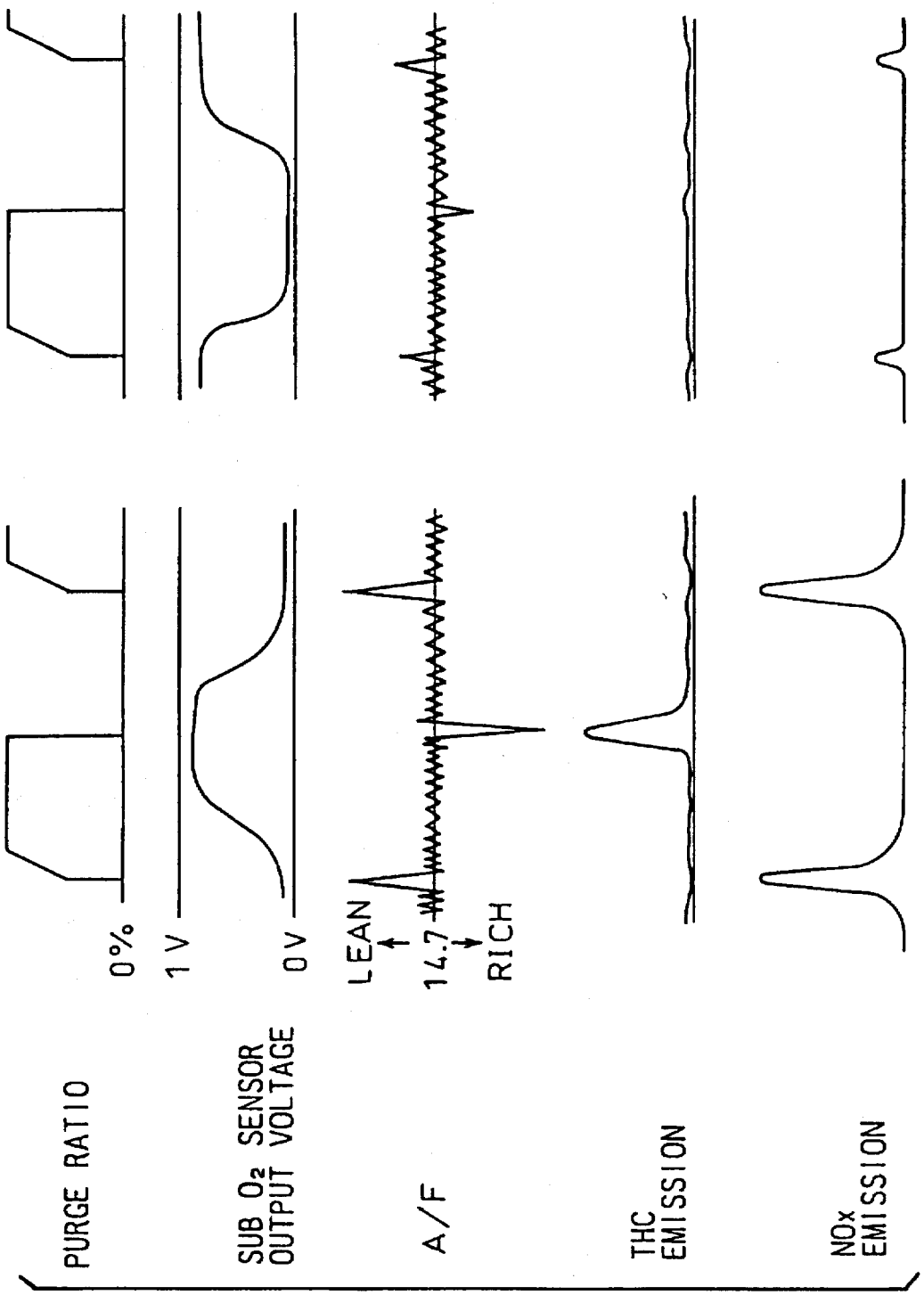

FUEL-VAPOR TREATMENT METHOD AND APPARATUS FOR INTERNAL COMBUSTION ENGINE

BACKGROUND OF THE INVENTION

1. Field of the Invention

The present invention relates to a fuel-vapor treatment method and apparatus, for an internal combustion engine, wherein, to prevent air pollution and fuel loss, fuel-vapor (hereinafter called the "vapor") evaporated from the fuel tank is temporarily stored and is then released into the air intake system depending on the engine operating condition.

2. Description of the Related Art

Generally, in a fuel-vapor treatment method and apparatus known in the prior art, the vapor is introduced into a canister for adsorption onto an adsorbent, such as activated charcoal, contained therein, and the adsorbed vapor is desorbed and released into the air intake system during the operation of the engine (this process is hereinafter called the "canister purge"). Control of the purge is performed by using a control valve installed in a purge passage between the canister and an intake passage downstream of the throttle valve, and by controlling the opening of the control valve to open or close the purge passage depending on the operating condition of the engine. More specifically, when the operating condition of the engine has passed from an operating region where the purge is not performed (low-load, low-revolution region) to an operating region where the purge is performed, the purge is set ON (purge start), that is, the purge control valve that has been in the closed condition is opened (hereinafter called the "valve opening"). The opening of the valve is duty-controlled based on the purge ratio (the ratio of the purge amount to the intake air amount) determined according to the operating condition. On the other hand, when the engine operating condition has passed from the operating region where the purge is performed to the operating region where the purge is not performed, the purge is set OFF (purge stop), that is, the purge control valve that has been in the open condition is closed (hereinafter called the "valve closing"). Further, while the purge is being carried out, the amount of fuel injection is corrected according to the amount of fuel purged from the viewpoint of air/fuel ratio control. For the above description, reference should be made, for example, to Japanese Patent Unexamined Publication No. 4-72453 (corresponding to U.S. Pat. No. 5,323,751).

In such a fuel-vapor treatment method and apparatus of the prior art, however, the purge-on or purge-off operation, that is, the opening or closing operation of the purge control valve, causes significant perturbations in air/fuel ratio (A/F), increasing the exhaust emissions. This is caused due to the presence of a response delay time, which is the time taken from the moment the purge control valve is opened or closed, until the vapor actually starts or stops flowing into the combustion chamber.

That is, when we consider vapor flow at the time of purge on, the air remaining in the purge passage leading from the purge control value to the intake passage is drawn into the combustion chamber before the vapor starts to flow into the combustion chamber after the purge control valve is opened. This tends to shift the air/fuel ratio toward the lean side. When such lean exhaust gas passes through the three-way catalyst for purification, if the atmosphere in the catalyst is also lean, the $O_2$ content becomes excessive, resulting in incomplete reduction of NOx (oxides of nitrogen) and thus increasing exhaust emissions (NOx).

At the time of purge off, on the other hand, the vapor already present in the purge passage is drawn into the combustion chamber before the vapor stops flowing into it after the purge control valve is closed. This tends to shift the air/fuel ratio toward the rich side. When such rich exhaust gas passes through the three-way catalyst, if the atmosphere in the catalyst is also rich, the $O_2$ content becomes low, resulting in incomplete oxidation of HC (hydrocarbons) and CO (carbon monoxide). This again increases the exhaust emissions (HC and CO).

To prevent such perturbations in air/fuel ratio, control has been performed to delay the correction timing of the fuel injection amount so that the time that the purge on/off effect shows up in the combustion chamber coincides with the time that the effect of the correction of the fuel injection amount associated with the purge shows up in the chamber. However, the response delay time between the opening or closing of the purge control valve and the effect of it showing up in the combustion chamber tends to increase as the purge passage deteriorates with age; furthermore, the response delay time varies from unit to unit. Preventing such perturbations in air/fuel ratio by the correction of the fuel injection amount is therefore an extremely difficult task to accomplish.

SUMMARY OF THE INVENTION

In view of the above situation, it is an object of the present invention to provide a fuel-vapor treatment method and apparatus for an internal combustion engine that do not introduce perturbations in the air/fuel ratio during purge-on or purge-off operations, thereby contributing to improving the accuracy of air/fuel ratio control and hence the accuracy of emission control.

To achieve the above object, according to a first aspect of the present invention, there is provided a fuel-vapor treatment method for an internal combustion engine, wherein a purge control valve, installed in a purge passage communicating between a canister for temporarily storing fuel vapor and an air intake passage downstream of a throttle valve, is opened or closed to open or close the purge passage, depending upon the engine operating condition, the method comprising the steps of: judging whether a catalyst in an exhaust-gas purifying catalytic converter installed in an exhaust passage of the internal combustion engine is in a lean atmosphere compared with a prescribed reference value; and prohibiting an operation to open the purge control valve when it is judged that the catalyst is in a lean atmosphere, and allowing an operation to open the purge control valve when it is judged that the catalyst is not in a lean atmosphere.

According to a second aspect of the present invention, there is provided a fuel-vapor treatment method for an internal combustion engine, wherein a purge control valve, installed in a purge passage communicating between a canister for temporarily storing fuel vapor and an air intake passage downstream of a throttle valve, is opened or closed to open or close the purge passage, depending upon the engine operating condition, the method comprising the steps of: judging whether a catalyst in an exhaust-gas purifying catalytic converter installed in an exhaust passage of the internal combustion engine is in a rich atmosphere compared with a prescribed reference value; and prohibiting an operation to close the purge control valve when it is judged that the catalyst is in a rich atmosphere, and allowing an operation to close the purge control valve when it is Judged that the catalyst is not in a rich atmosphere.

According to a third aspect of the present invention, there is provide a fuel-vapor treatment apparatus for an internal combustion engine, wherein a purge control valve, installed in a purge passage communicating between a canister for temporarily storing fuel vapor and an air intake passage downstream of a throttle valve, is opened or closed to open or close the purge passage, depending upon the engine operating condition, the apparatus comprising: lean atmosphere judging means for judging whether a catalyst in an exhaust-gas purifying catalytic converter installed in an exhaust passage of the internal combustion engine is in a lean atmosphere compared with a prescribed reference value; and purge-on prohibiting means for prohibiting an operation to open the purge control valve when it is judged by the lean atmosphere judging means that the catalyst is in a lean atmosphere, and allowing an operation to open the purge control valve when it is judged that the catalyst is not in a lean atmosphere.

According to a fourth aspect of the present invention, there is provided a fuel-vapor treatment apparatus for an internal combustion engine, wherein a purge control valve, installed in a purge passage communicating between a canister for temporarily storing fuel vapor and an air intake passage downstream of a throttle valve, is opened or closed to open or close the purge passage, depending upon the engine operating condition, the apparatus comprising: a rich atmosphere judging means for judging whether a catalyst in an exhaust-gas purifying catalytic converter installed in an exhaust passage of the internal combustion engine is in a rich atmosphere compared with a prescribed reference value; and purge-off prohibiting means for prohibiting an operation to close the purge control valve when it is judged by the rich atmosphere judging means that the catalyst is in a rich atmosphere, and allowing an operation to close the purge control valve when it is judged that the catalyst is not in a rich atmosphere.

In the method or apparatus according to the first or third aspect, the valve opening operation of the purge control valve which entails making lean the air/fuel ratio is prohibited when the catalyst is in a lean atmosphere, and allowed when it is in a rich atmosphere. Consequently, the effect associated with the opening of the purge control valve is offset by the effect of the catalyst being in a rich atmosphere. That is, the perturbations in air/fuel ratio caused by the opening of the purge control value are effectively accommodated by the catalyst.

In the method or apparatus according to the second or fourth aspect, the valve closing operation of the purge control valve which entails enrichment of the air/fuel ratio is prohibited when the catalyst is in a rich atmosphere, and allowed when it is in a lean atmosphere. Consequently, the effect of enrichment associated with the closing of the purge control valve is offset by the effect of the catalyst being in a lean atmosphere. That is, the perturbations in air/fuel ratio caused by the closing of the purge control value are effectively accommodated by the catalyst.

BRIEF DESCRIPTION OF THE DRAWINGS

Further features and advantages of the present invention will be apparent from the following description with reference to the accompanying drawings, in which:

FIG. 8 is a flowchart illustrating the processing sequence of a decision-making routine for allowing or prohibiting purge-on/purge-off operations according to a fourth embodiment of the present invention;

FIGS. 9A and 9B are a flowchart illustrating the processing sequence of a decision-making routine for allowing or prohibiting purge-on/purge-off operations according to a fifth embodiment of the present invention;

FIG. 12 is an output characteristic diagram for a zirconia $O_2$ sensor; and

FIG. 13 is a diagram showing (A) the worst-case exhaust gas condition when controlled by the prior art, and (B) the exhaust gas condition when controlled by the present invention.

DESCRIPTION OF THE PREFERRED EMBODIMENTS

The preferred embodiments of the present invention will be described below with reference to the accompanying drawings.

Figure 1:
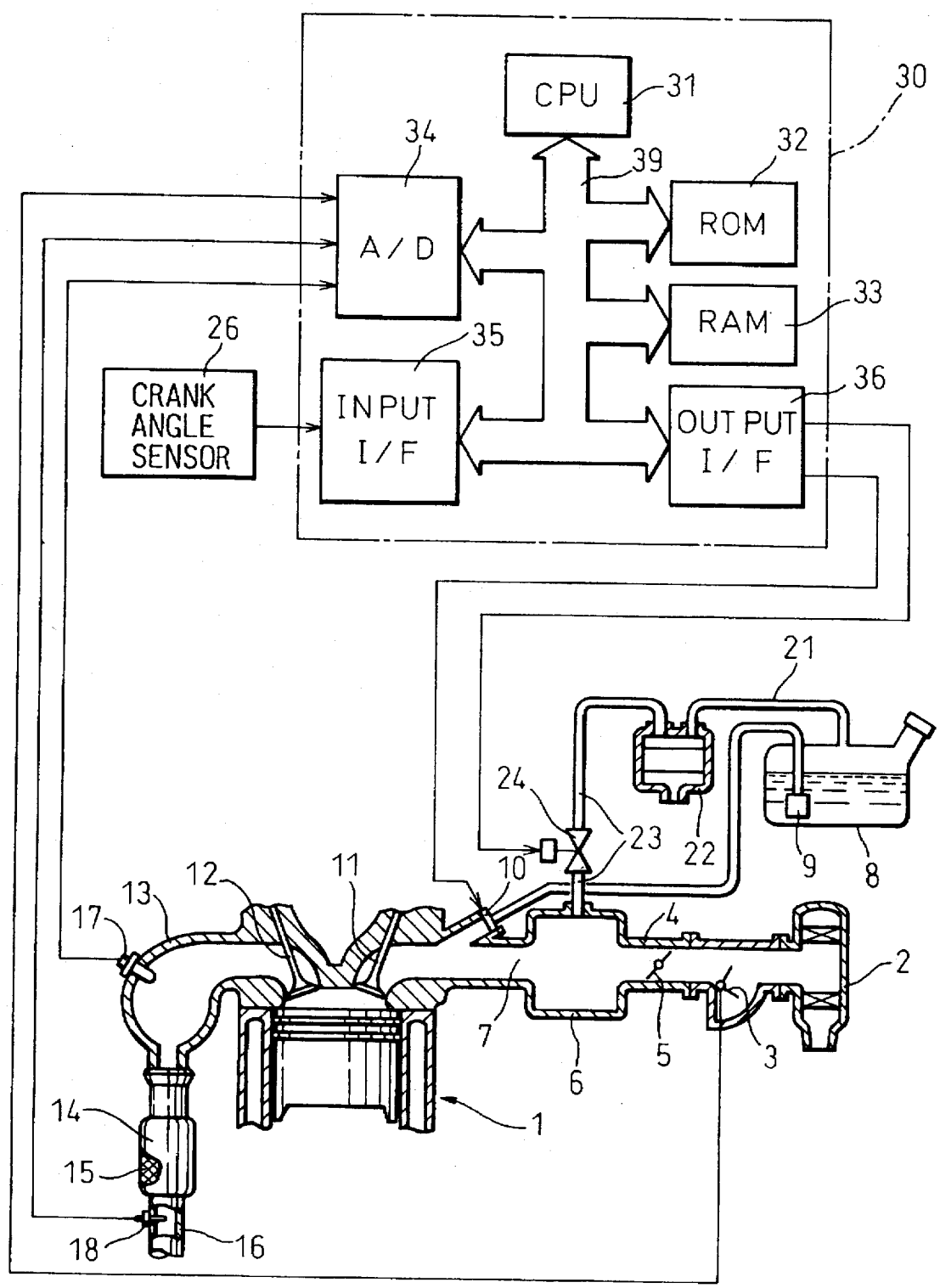
FIG. 1 is a diagram showing the general construction of a fuel-vapor treatment apparatus according to the embodiment of the present invention.

FIG. 1 is a diagram showing the general construction of a fuel-vapor treatment apparatus for an internal combustion engine according to an embodiment of the present invention. Air necessary for combustion in the engine is filtered through an air cleaner 2, and introduced through a throttle body 4 into a surge tank 6 for distribution to an intake pipe 7 for each cylinder. The amount of intake air, which is measured by an air flow meter 3, is regulated by a throttle valve 5 provided in the throttle body 4.

On the other hand, the fuel stored in a fuel tank 8 is drawn by a fuel pump 9 and injected into the intake pipe 7 through a fuel injector valve 10. The air and fuel thus supplied are mixed together in the intake pipe 7, and the mixture is drawn through an intake valve 11 into the cylinder 1, that is, into the engine body. In the cylinder 1, the air/fuel mixture is first compressed by the piston, and then ignited and burned causing a rapid pressure rise and thus producing power.

The burned air/fuel mixture is discharged as exhaust gas into an exhaust manifold 13 through an exhaust valve 12. A catalytic converter 14 is mounted in an exhaust system and located downstream of the exhaust manifold 13. This catalytic converter 14 contains a three-way catalyst 15 which simultaneously promotes the oxidation of unburnt constituents in the exhaust gas and the reduction of nitrogen oxides. The exhaust gas purified in the catalytic converter 14 is discharged through an exhaust pipe 16. A main $O_2$ sensor 17 is mounted in the exhaust manifold 13 upstream of the catalytic converter 14, while a sub $O_2$ sensor 18 is mounted in the exhaust pipe 16 downstream of the catalytic converter 14. These sensors constitute a so-called double $O_2$ sensor system for air/fuel ratio feedback control.

The fuel-vapor from the fuel tank 8 is introduced through a vapor passage 21 into a canister 22 where the vapor is temporarily stored by being adsorbed on activated charcoal (adsorbent) in the canister 22. The canister 22 is connected via a purge passage 23 to an intake passage downstream of the throttle valve 5. The purge passage 23 is provided with a purge control valve 24. When the purge control valve 24 is opened, the negative pressure in the intake pipe causes the vapor stored in the canister 22 to be drawn into the intake pipe 7 through the purge passage 23, and the thus drawn vapor is mixed with the fuel injected through the fuel injector valve 10 for use as fuel in the cylinder 1.

An engine electronic control unit (engine ECU) 30 is a microcomputer system that performs canister purge control, that is, the fuel-vapor treatment control contemplated by the invention, as well as fuel injection control, ignition timing control, etc. In accordance with programs stored in a ROM 32, a CPU 31 accepts signals from various sensors via an A/D conversion circuit 34 or via an input interface circuit 35, and performs operations, based on the input signals, based on which control signals for various actuators are generated and output via an output interface circuit 36. A RAM 33 is used to temporarily store data during the operations and to control processes. The constituent parts of the ECU are interconnected by a system bus 39 (which consists of an address bus, a data bus, and a control bus).

Basically, fuel injection control is performed by calculating the fuel injection amount, that is, the injection time of the fuel injector valve 10, from the intake air flow rate measured by the air flow meter 3 and the engine rpm obtained from a crank angle sensor 26, and by injecting fuel at the moment that a predetermined crank angle is reached. In the above calculation, corrections are made using signals from various sensors including a throttle opening sensor, water temperature sensor, and intake air temperature sensor (not shown) as well as the $O_2$ sensors 17 and 18. This embodiment, in particular, employs a double $O_2$ sensor system for air/fuel ratio feedback correction, as noted above. Ignition timing control is carried out by comprehensively judging the engine condition from the signals from various sensors as well as the engine rpm, and by determining optimum ignition timing with which to send an ignition signal to the igniter. Canister purge control, i.e., the fuel-vapor treatment according to the invention, will be described below.

In such purge control, the invention is characterized in that the optimum timings with which to initiate purge-start (purge-on) and purge-stop (purge-off) operations are determined based on the condition of the catalyst atmosphere, as previously described. That is, a decision-making procedure for allowing or prohibiting the purge-on/purge-off operations is added before the purge operation control procedure performed in the prior art. The result of the decision from such a decision-making routine for allowing or prohibiting the purge-on/purge-off operations is carried as a flag over to the prior art purge operation control routine in which the flag is referenced. The catalyst atmosphere can be judged from the output of the sub $O_2$ sensor 18 in the double $O_2$ sensor system. In this embodiment, a zirconia $O_2$ sensor having the output characteristic shown in FIG. 12 is used as the sub $O_2$ sensor 18. As can be seen from FIG. 12, the output voltage of this sensor is high when the atmosphere is rich, and low when the atmosphere is lean. An explanation will now be given of how the decision to allow or not allow the purge-on/purge-off operations is made on the basis of the output of the sub $O_2$ sensor.

Figure 2:
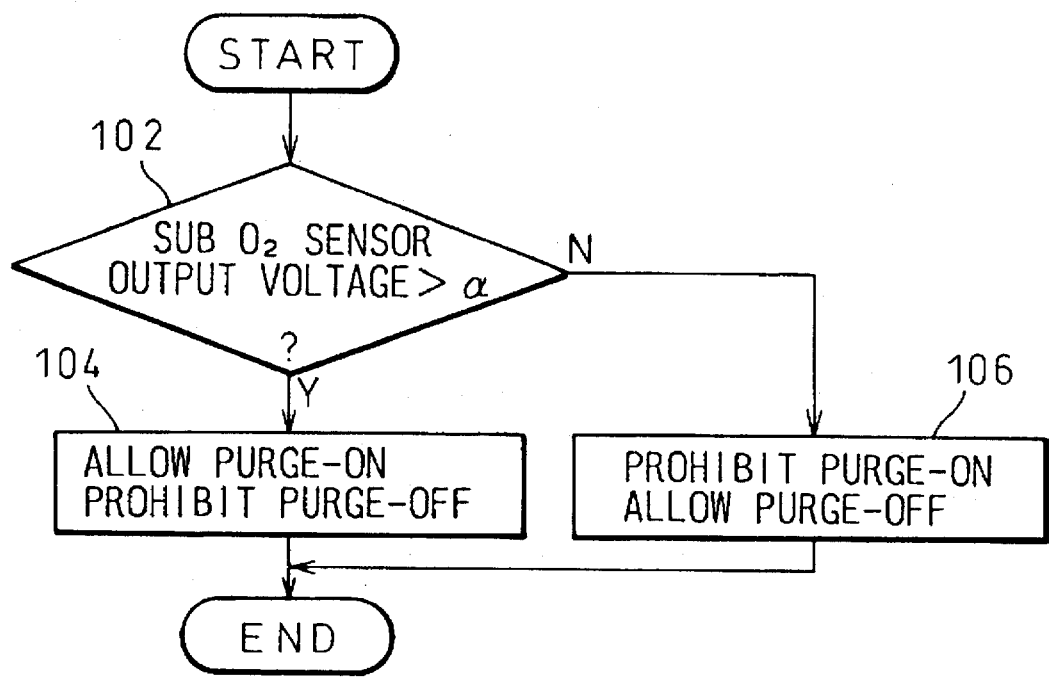
FIG. 2 is a flowchart illustrating the processing sequence of a decision-making routine for allowing or prohibiting purge-on/purge-off operations according to a first embodiment of the present invention.
Figure 3:
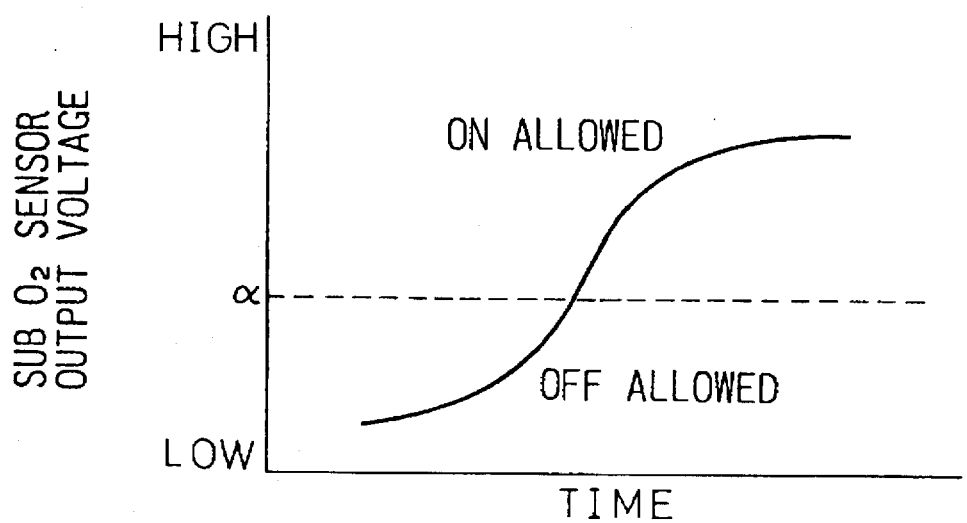
FIG. 3 is a diagram for explaining the criterion used in the first embodiment for making a decision whether the purge-on/purge-off operations should be allowed or prohibited.

FIG. 2 is a flowchart illustrating the processing sequence of a decision-making routine for allowing or prohibiting purge-on/purge-off operations according to a first embodiment of the invention. In the first embodiment, the criterion shown in FIG. 3 is used. That is, a sensor output voltage $\alpha$ (for example, 4.5 V) is set that indicates a catalyst atmosphere neither rich nor lean, or in other words, at stoichiometry. Then, when the present output voltage of the sub $O_2$ sensor 18 is greater than $\alpha$, indicating a rich atmosphere, the purge-off operation which entails enrichment is prohibited and the purge-on operation which entails making the exhaust lean is allowed. Conversely, when the present output voltage of the sub $O_2$ sensor 18 is not greater than $\alpha$, indicating a lean atmosphere, the purge-on operation which entails making the exhaust lean is prohibited and the purge-off operation which entails enrichment is allowed.

In a specific procedure, as shown in the flowchart of FIG. 2, first the output voltage of the sub $O_2$ sensor 18 is detected, and a decision is made as to whether the output voltage is greater than $\alpha$ (step 102). If the answer to the decision is YES, a prescribed purge-on permit flag is set to 1 to permit the purge-on operation, while a prescribed purge-off permit flag is set to 0 to prohibit the purge-off operation (step 104). On the other hand, if the answer is NO, the purge-on permit flag is set to 0 to prohibit the purge-on operation, while the purge-off permit flag is set to 1 to permit the purge-off operation (step 106). The thus set purge-on permit flag and purge-off permit flag are referenced in the purge operation control procedure subsequently performed; when the value of the associated flag is 1, purge on or purge off is permitted. Since the catalyst atmosphere passes from rich to lean and vice versa in a certain cycle, the above processing causes the purge-on/purge-off operations to be temporarily inhibited and thereby delayed, but this prevents perturbations in air/fuel ratio, as previously described. It should be noted here that the decision-making routine for allowing or prohibiting purge-on/purge-off operations and the subsequent purge operation control processing routine are executed in a cycle sufficiently shorter than the rich/lean cycle.

Figure 4:
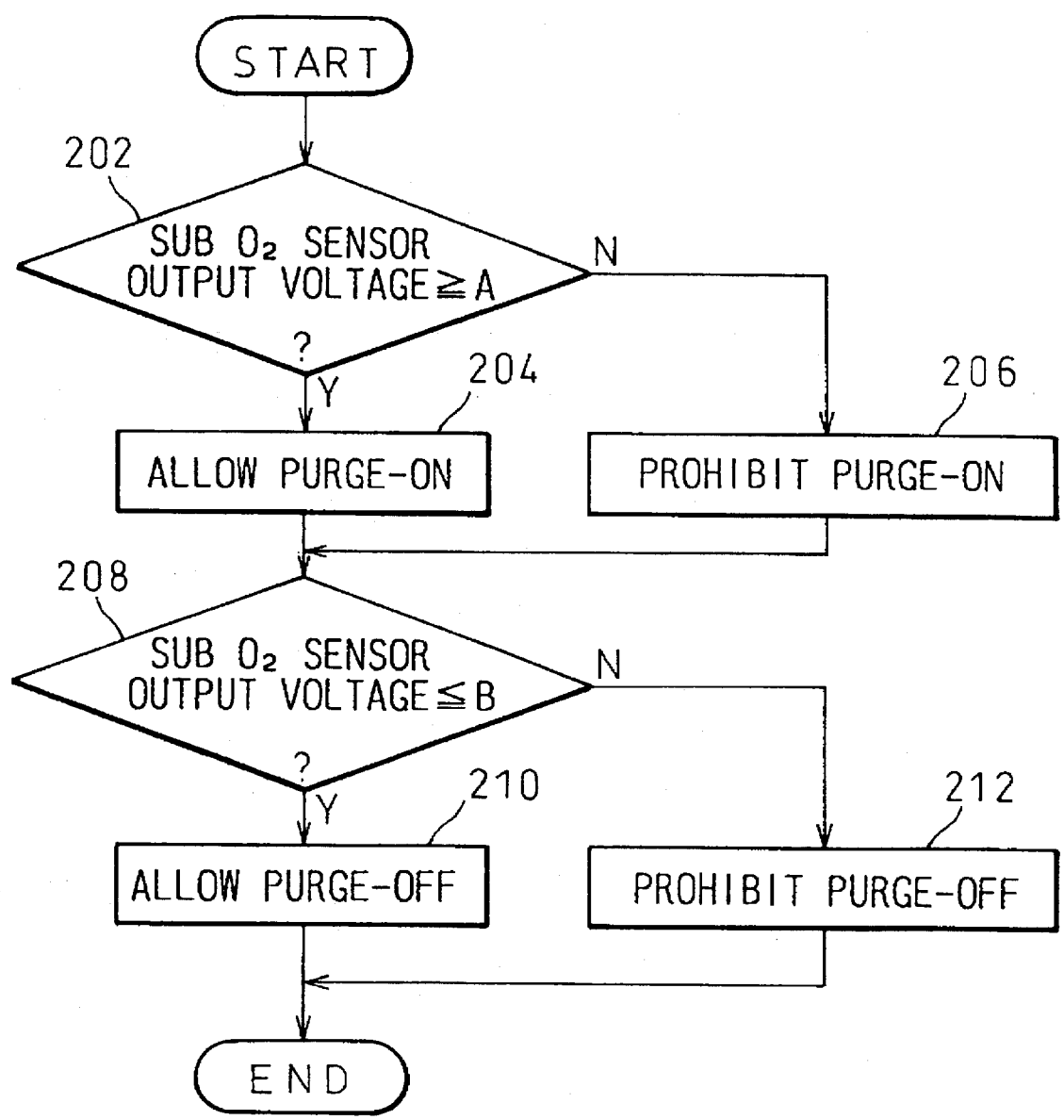
FIG. 4 is a flowchart illustrating the processing sequence of a decision-making routine for allowing or prohibiting purge-on/purge-off operations according to a second embodiment of the present invention.
Figure 5:
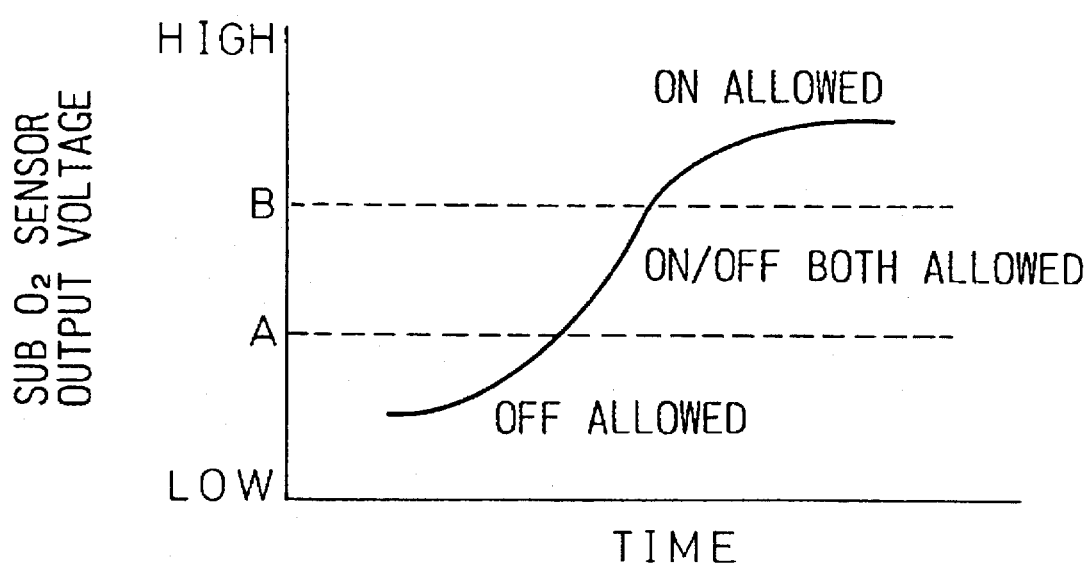
FIG. 5 is a diagram for explaining the criterion used in the second embodiment for making a decision whether the purge-on/purge-off operations should be allowed or prohibited.

FIG. 4 is a flowchart illustrating the processing sequence of a decision-making routine for allowing or prohibiting purge-on/purge-off operations according to a second embodiment of the invention. In the second embodiment, the reference voltage value $\alpha$ used in the first embodiment is replaced by two reference voltages A and B (A<B) located near stoichiometry, as shown in FIG. 5. Purge-on is allowed when the output voltage of the sub $O_2$ sensor 18 is greater than or equal to A, and prohibited when it is smaller than A (steps 202, 204, and 206). On the other hand, purge-off is allowed when the output voltage of the sub $O_2$ sensor 18 is smaller than or equal to B, and prohibited when it is greater than B (steps 208, 210, and 212). With this arrangement, purge-on and purge-off are both allowed near stoichiometry; the effect of this is to increase the chance of performing purge-on/purge-off operations as compared to the first embodiment.

Figure 6:
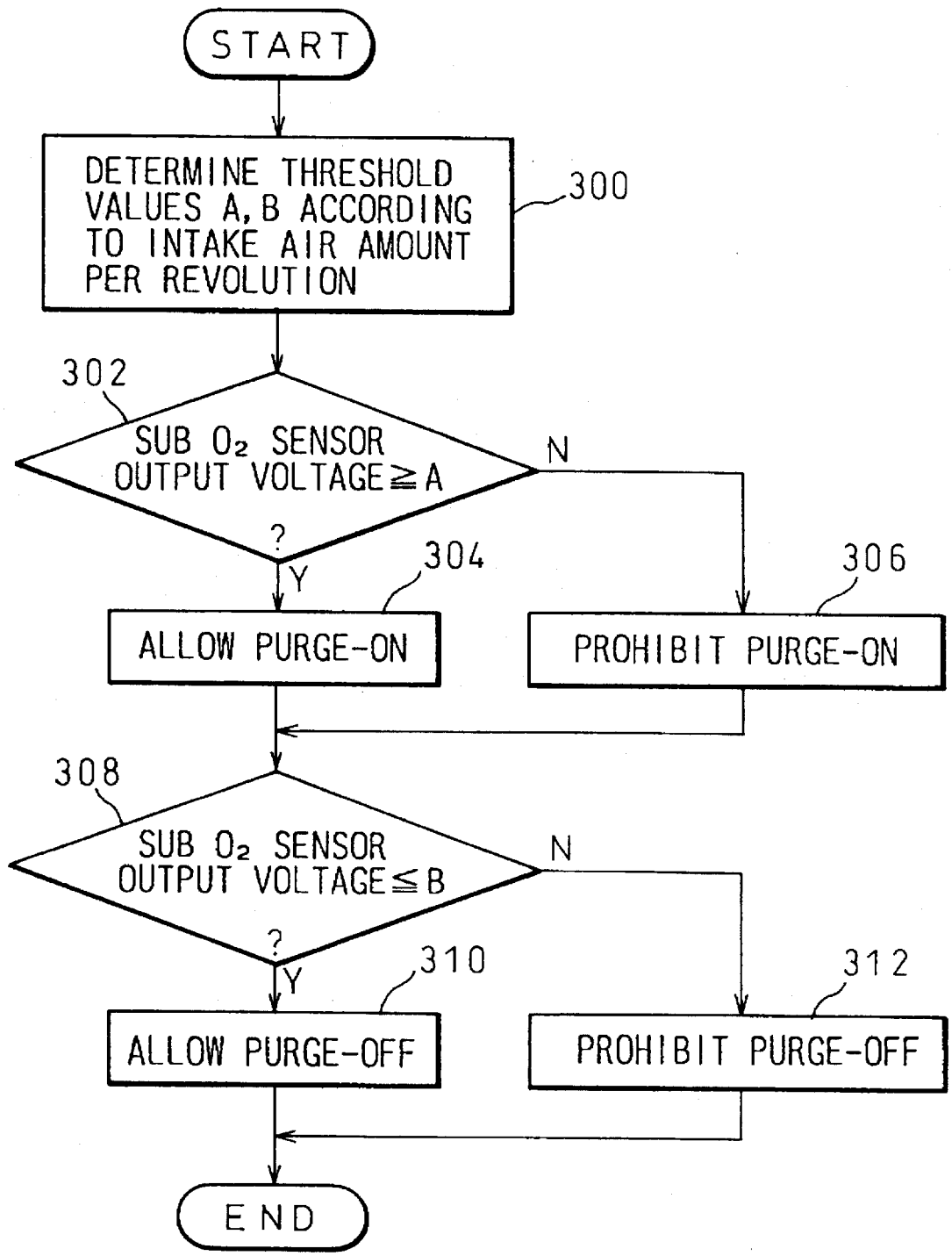
FIG. 6 is a flowchart illustrating the processing sequence of a decision-making routine for allowing or prohibiting purge-on/purge-off operations according to a third embodiment of the present invention.
Figure 7:
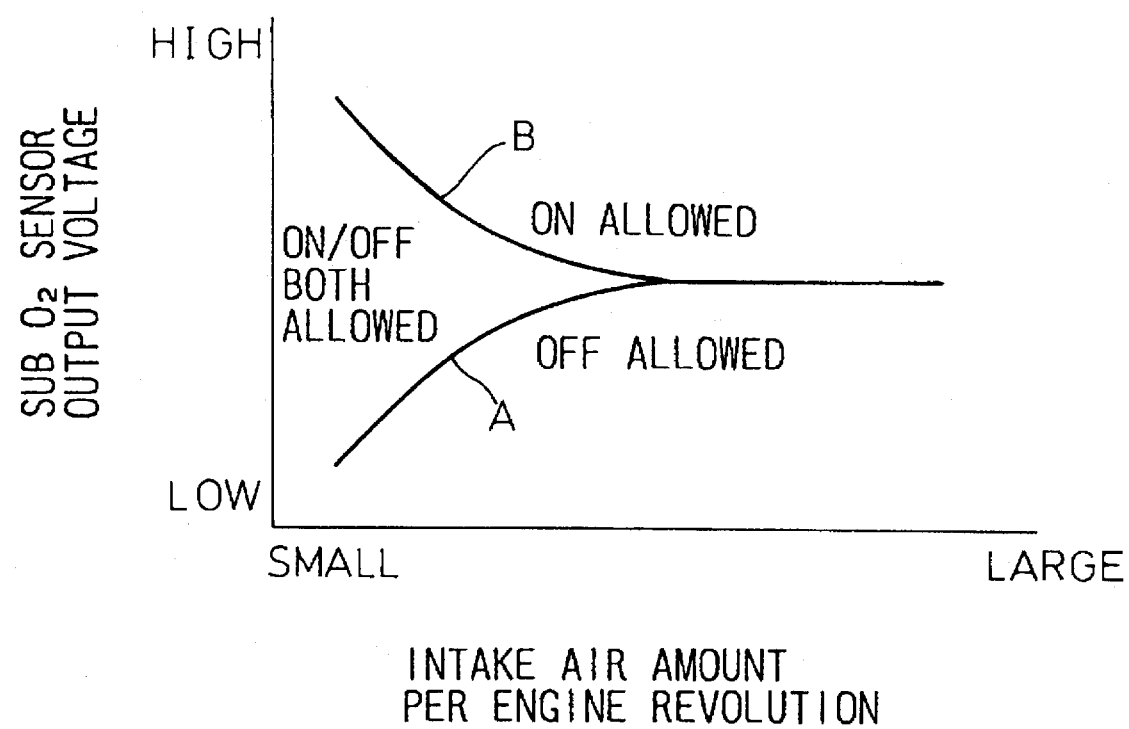
FIG. 7 is a diagram for explaining the criterion used in the third embodiment for making a decision whether the purge-on/purge-off operations should be allowed or prohibited.

FIG. 6 is a flowchart illustrating the processing sequence of a decision-making routine for allowing or prohibiting purge-on/purge-off operations according to a third embodiment of the invention. In the second embodiment, the threshold values A and B were fixed, but in the third embodiment, these values A and B are varied according to the amount of intake air per engine revolution. More specifically, for the amount of intake air per engine revolution, the values A and B are set as shown in FIG. 7; that is, the region where purge-on and purge-off are both allowed is made larger as the amount of intake air decreases. The reason for this is that when the amount of intake air per engine revolution is small, the amount of exhaust gas is also small and therefore, the effect on exhaust emissions decreases, so that the chance of performing purge-on/purge-off operations should be increased accordingly. In a specific procedure, first, in step 300, the threshold values A and B are determined by referencing a map stored in the ROM 32, such as the one shown in FIG. 7, using the current intake air amount per engine revolution as the key. The subsequent steps 302 to 312 are the same as the steps 202 to 212 shown in FIG. 4 in the second embodiment.

FIG. 8 is a flowchart illustrating the processing sequence of a decision-making routine for allowing or prohibiting purge-on/purge-off operations according to a fourth embodiment of the invention. In the fourth embodiment, the decision to allow or not allow purge on (steps 402 to 406) is made by reference to the threshold value A, as in the second embodiment shown in FIG. 2. However, for purge-off, a purge density learning value is taken into account in addition to the threshold value B. That is, a fuel-vapor treatment apparatus has been known that is equipped with a means for learning the density of fuel-vapor purged into the intake pipe on the basis of an air/fuel ratio feedback coefficient. This embodiment is intended for an apparatus equipped with such learning means, and when the purge density learning value FGPG is greater than or equal to 1.0, it is determined that air is contained in the canister. When the FGPG is greater than or equal to 1.0, a rich gas at the time of purge off, that is, enrichment associated with purge off, does not occur. This condition is considered in the present embodiment.

In a specific procedure, first, a decision is made as to whether or not FGPG is greater than or equal to 1.0 (step 408). If the answer to the decision is YES, the purge-off operation is allowed without checking the output voltage of the sub $O_2$ sensor 18 (step 412); on the other hand, if the answer is NO, the output voltage of the sub $O_2$ sensor 18 is compared with the threshold value B, as in the second embodiment, to decide whether to allow or not allow the purge-off operation (steps 410, 412, and 414).

Figure 9A:
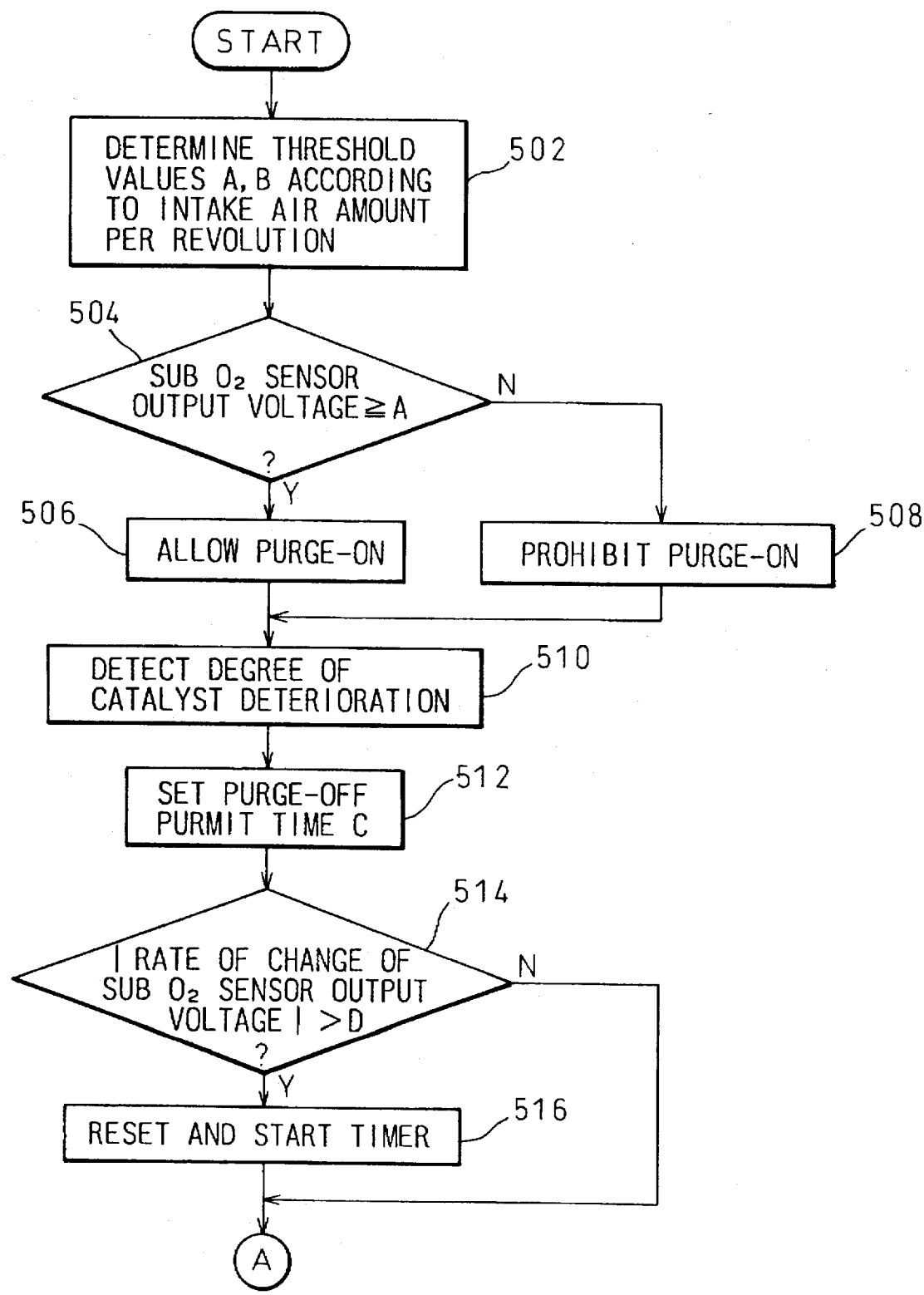
Figure 10:
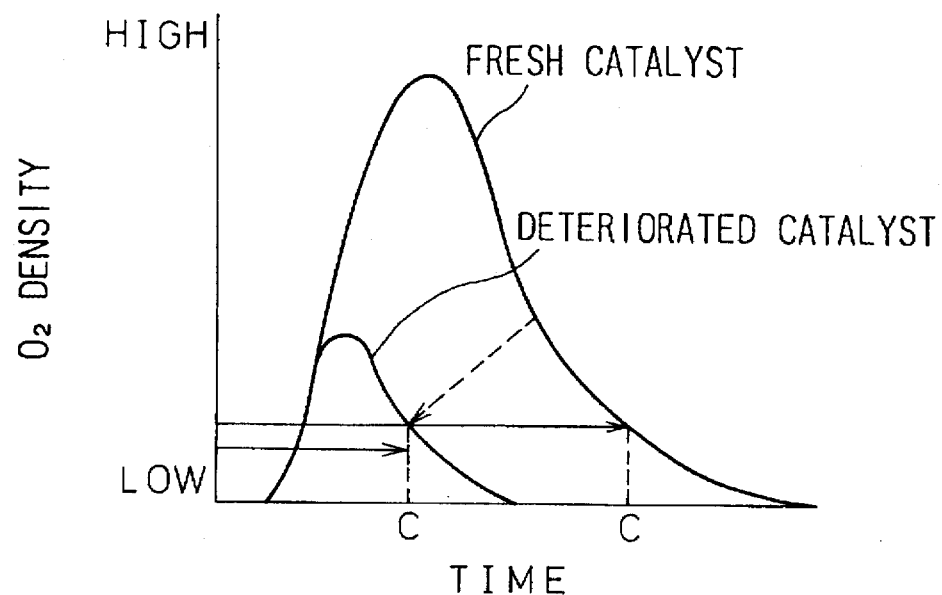
FIG. 10 is a characteristic diagram for explaining the setting of a purge-off permit time according to the degree of catalyst deterioration.

FIGS. 9A and 9B are a flowchart illustrating the processing sequence of a decision-making routine for allowing or prohibiting purge-on/purge-off operations according to a fifth embodiment of the invention. In the fifth embodiment, the processing leading up to the decision to allow or not allow the purge-on operation (steps 502 to 508) is the same as that illustrated in the third embodiment, and the decision is made based on the threshold value A determined by taking into account the amount of intake air. For the purge-off operation, however, the degree of deterioration of the catalyst is taken into account in addition to the threshold value B. The reason for this is, as the catalyst deteriorates, the $O_2$ storage effect weakens and the oxygen intake decreases, as shown in FIG. 10. This means that as the catalyst deteriorates, the effect of enrichment associated with purge off increases. This embodiment addresses the problem associated with catalyst deterioration by tightening the purge-off conditions; that is, in addition to the condition that the output voltage of the sub $O_2$ sensor should not be greater than B, a condition is set that the purge-off operation should be allowed only for a prescribed length of time (C in FIG. 10) from the instant of a rich-to-lean transition, the length of time being determined according to the degree of catalyst deterioration.

Figure 11:
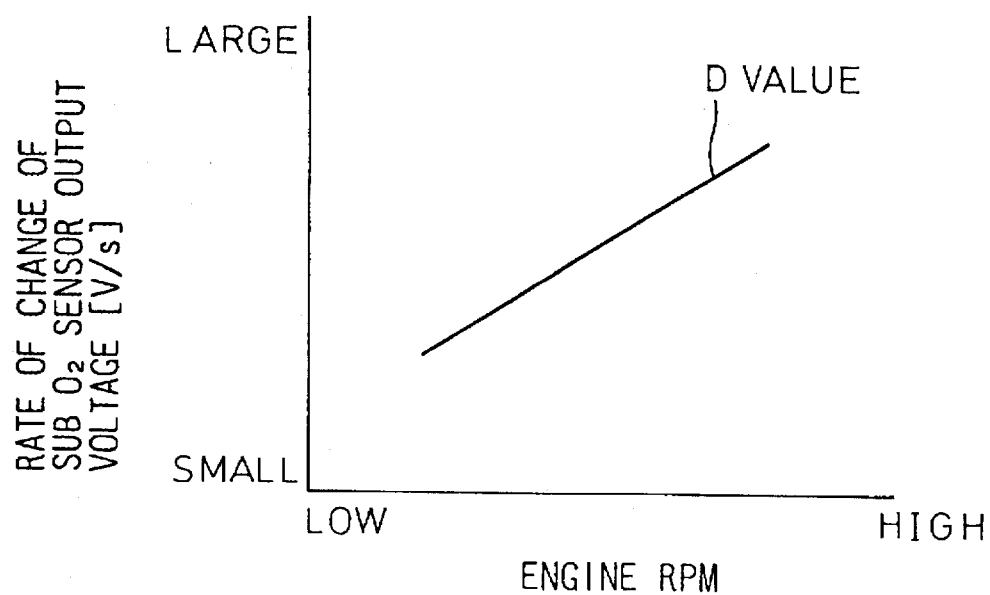
FIG. 11 is a characteristic diagram for detecting a rich-to-lean transition based on the rate of change of output voltage of a sub $O_2$ sensor 18.

In a specific procedure, first the degree of deterioration of the catalyst is detected (step 510). Since it is known that such catalyst deterioration detecting means can be implemented using a double $O_2$ sensor system, no specific description is given of such means. Next, by referencing a map stored in the ROM 32, such as the one shown in FIG. 10, the purge-off permit time C appropriate to the current degree of catalyst deterioration is obtained (step 512). Then, whether the current time coincides with a rich-to-lean transition is determined in the following way. That is, a threshold value D for the rate of change of the output voltage of the sub $O_2$ sensor 18, used as a reference to discriminate a rich-to-lean transition, is predetermined as a function of engine rpm, and a map, such as the one shown in FIG. 11, is stored in advance in the ROM 32. Then, the D value is determined from the current engine rpm, and a decision is made as to whether the absolute value of the rate of change of the output voltage of the sub $O_2$ sensor 18 is greater than D (step 514). If the answer is YES, that is, in the case of the occurrence of a rich-to-lean transition, a prescribed timer is reset and started (step 516). This processing routine is executed in a cycle sufficiently shorter than the rich/lean repeating cycle and than the time required for the transition so that such transition can be detected without fail during any execution cycle of the routine. The elapsed time from the occurrence of the transition is thus measured by the timer.

Next, a decision is made as to whether the output voltage of the sub $O_2$ sensor 18 falls within a range not greater than the threshold value B (step 518). If the answer to decision is NO, purge off is prohibited (step 524), and if the answer is YES, the process proceeds to step 520. In step 520, a decision is made as to whether or not the current timer value is smaller than or equal to the C value determined in step 512. If the answer to the decision is YES, purge off is allowed (step 522), and if the answer is NO, purge off is prohibited (step 524). As described above, in this embodiment, purge-off prohibiting control is made variable depending on the deterioration of the catalyst.

FIG. 13(A) shows the worst-case exhaust gas condition when controlled by the prior art, and FIG. 13(B) shows the corresponding exhaust gas condition when controlled by the present invention. As shown in FIG. 13(A), in the prior art, when the output voltage of the sub $O_2$ sensor is low, that is, when the catalyst atmosphere is lean, if a purge-on operation is performed which entails making the atmosphere lean, a lean spike occurs in the air/fuel ratio (A/F), and the NOx emission increases. Conversely, when the output voltage of the sub $O_2$ sensor is high, that is, when the catalyst atmosphere is rich, if a purge-off operation is performed which entails enrichment, a rich spike occurs in A/F, and the total HC emission increases. However, when control is performed according to the present invention, the above-described situations do not occur, and perturbations in air/fuel ratio are prevented, as shown in FIG. 13(B).

The present invention has been described by way of preferred embodiments, but it will be appreciated that the invention is not limited to the illustrated embodiments. Rather, it will be easy for those skilled in the art to devise various other embodiments.

As describe above, according to the invention, a fuel-vapor treatment method and apparatus for an internal combustion engine are provided that do not introduce perturbations in air/fuel ratio during purge-on or purge-off operations. More specifically, in the method or apparatus according to the first or third aspect of the invention, when the catalyst is in a lean atmosphere, the valve opening operation of the purge control valve which entails making the air/fuel ratio lean is prohibited, thus preventing an increase in exhaust emissions (NOx). Further, in the method or apparatus according to the second or fourth aspect of the invention, when the catalyst is in a rich atmosphere, the valve closing operation of the purge control valve which entails enrichment of the air/fuel ratio is prohibited, thus preventing an increase in exhaust emissions (HC and CO).

What is claimed is:

1. A fuel-vapor treatment method for an internal combustion engine, wherein a purge control valve, installed in a purge passage communicating between a canister for temporarily storing fuel-vapor and an air intake passage downstream of a throttle valve, is opened or closed to open or close said purge passage, depending upon the engine operating condition, said method comprising the steps of:

judging whether a catalyst in an exhaust-gas purifying catalytic converter installed in an exhaust passage of said internal combustion engine is in a lean atmosphere compared with a prescribed reference value; and prohibiting an operation to open said purge control valve when it is judged that said catalyst is in a lean atmosphere, and allowing an operation to open said purge control valve when it is judged that said catalyst is not in a lean atmosphere.

2. A fuel-vapor treatment method for an internal combustion engine, wherein a purge control valve, installed in a purge passage communicating between a canister for temporarily storing fuel-vapor and an air intake passage downstream of a throttle valve, is opened or closed to open or close said purge passage, depending upon the engine operating condition, said method comprising the steps of:

judging whether a catalyst in an exhaust-gas purifying catalytic converter installed in an exhaust passage of said internal combustion engine is in a rich atmosphere compared with a prescribed reference value; and prohibiting an operation to close said purge control valve when it is judged that said catalyst is in a rich atmosphere, and allowing an operation to close said purge control valve when it is judged that said catalyst is not in a rich atmosphere.

3. A fuel-vapor treatment apparatus for an internal combustion engine, wherein a purge control valve, installed in a purge passage communicating between a canister for temporarily storing fuel-vapor and an air intake passage downstream of a throttle valve, is opened or closed to open or close said purge passage, depending upon the engine operating condition, said apparatus comprising:

lean atmosphere judging means for judging whether a catalyst in an exhaust-gas purifying catalytic converter installed in an exhaust passage of said internal combustion engine is in a lean atmosphere compared with a prescribed reference value; and purge-on prohibiting means for prohibiting an operation to open said purge control valve when it is judged by said lean atmosphere judging means that said catalyst is in a lean atmosphere, and allowing an operation to open said purge control valve when it is judged that said catalyst is not in a lean atmosphere.

4. A fuel-vapor treatment apparatus for an internal combustion engine, wherein a purge control valve, installed in a purge passage communicating between a canister for temporarily storing fuel-vapor and an air intake passage downstream of a throttle valve, is opened or closed to open or close said purge passage, depending upon the engine operating condition, said apparatus comprising:

rich atmosphere judging means for judging whether a catalyst in an exhaust-gas purifying catalytic converter installed in an exhaust passage of said internal combustion engine is in a rich atmosphere compared with a prescribed reference value; and purge-off prohibiting means for prohibiting an operation to close said purge control valve when it is judged by said rich atmosphere judging means that said catalyst is in a rich atmosphere, and allowing an operation to close said purge control valve when it is judged that said catalyst is not in a rich atmosphere.

5. The apparatus according to claim 4, further comprising:

catalyst deterioration detecting means for detecting the degree of deterioration of said catalyst; and purge-off prohibiting control varying means for varying control by said purge-off prohibiting means depending on the degree of deterioration of said catalyst such that said purge-off prohibiting means allows the operation to close said purge control valve only for a prescribed length of time from the instant of a transition from a rich atmosphere to a nonrich atmosphere, said length of time being determined according to the degree of catalyst deterioration detected by said catalyst deterioration detecting means.

* * * * *